(12) United States Patent
Totten (10) Patent No.: US 8,082,454 B2
(45) Date of Patent: Dec. 20, 2011

(54) MANAGING POWER CONSUMPTION BASED ON HISTORICAL AVERAGE

(75) Inventor: Brian Christopher Totten, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 11/936,152

(22) Filed: Nov. 7, 2007

(65) Prior Publication Data

US 2009/0119523 A1 May 7, 2009

(51) Int. Cl.
*G06F 1/32* (2006.01)
(52) U.S. Cl. .......................... 713/300; 713/320; 713/340
(58) Field of Classification Search .................. 713/300, 713/320, 322, 324, 340
See application file for complete search history.

(56) References Cited

U.S. PATENT DOCUMENTS

| | | | |
|---|---|---|---|
| 6,791,942 B2 | 9/2004 | Jin | |
| 7,017,061 B2 | 3/2006 | Lippert et al. | |
| 7,145,454 B2 | 12/2006 | Linjama et al. | |
| 7,240,225 B2 | 7/2007 | Brewer et al. | |
| 7,730,333 B2 * | 6/2010 | Berkes et al. | 713/300 |
| 2002/0130712 A1 * | 9/2002 | Naffziger et al. | 327/544 |
| 2003/0188210 A1 * | 10/2003 | Nakazato | 713/320 |
| 2004/0268166 A1 | 12/2004 | Farkas et al. | |
| 2006/0069931 A1 | 3/2006 | Shin et al. | |
| 2006/0123422 A1 | 6/2006 | Felter et al. | |
| 2006/0294400 A1 * | 12/2006 | Diefenbaugh et al. | 713/300 |
| 2007/0067656 A1 | 3/2007 | Ranganathan et al. | |

OTHER PUBLICATIONS

Femal, et al. "Boosting Data Center Performance Through Non-Uniform Power Allocation", Department of Computer Science, North Carolina State University, Proceedings of the Second International Conference on Autonomic Computing (ICAC'05) Dec. 31, 2005, pp. 1-12.

* cited by examiner

*Primary Examiner* — Thomas Lee
*Assistant Examiner* — Paul Yanchus, III
(74) *Attorney, Agent, or Firm* — Cynthia G. Seal; Jeffrey L. Streets (57) ABSTRACT

An upper power limit and an average power limit that is less than the upper power limit are selected for each server of a computer system having a plurality of servers. The instantaneous power consumption and the average power consumption of each server is determined and the instantaneous power consumption of each server is prevented from exceeding the respective upper power limit. A first subset of the servers for which the average power consumption is less than the average power limit are identified. The instantaneous power consumption of each server is allowed to exceed the respective average power limit. A second subset of the servers for which the average power consumption is not less than the average power limit is identified, and the instantaneous power consumption of each server in the second subset is prevented from exceeding the respective average power limit.

16 Claims, 4 Drawing Sheets

MANAGING POWER CONSUMPTION BASED ON HISTORICAL AVERAGE

BACKGROUND OF THE INVENTION

1. Field of the Invention

The present invention relates to managing power in an electronic system having a plurality of electronic devices.

2. Description of the Related Art

Servers and other computer hardware are often grouped together on a rack to conserve space and place the servers and infrastructure in a central location for access by an administrator. Managing these "rack systems" can be easier and less expensive than separately administering a multitude of scattered servers. Rack systems are available in a range of size, density, and design. Some rack systems may be built around servers that are self-supporting in that each server has an individual chassis, on-board power supply, cooling fan, and other support devices. The self-supporting servers may be grouped in a rack or tower configuration and networked to each other and to client computers. A higher density rack system can be achieved using leaner "blade servers" with shared support modules that are connected in a multi-blade chassis. Blade servers generally achieve greater density due to having a narrower form factor and sharing support modules such as blower and power modules. Some of the more compact rack system server arrangements presently available include the SYSTEM X servers and eServer BLADECENTER available from IBM (IBM, BLADECENTER, and SYSTEM X are registered trademarks of International Business Machines Corporation, Armonk, N.Y.).

Power management is important for many aspects of operating a rack system, such as to minimize the costs of operating the servers, minimize the heat generated by the servers, and to optimize the performance and efficiency of the system. Increasingly, server power is being monitored and limited by power capping according to a user-settable power limit (interchangeably referred to as a "power cap"). A feedback-based power management system may be used to "throttle" the processors and/or memory on a server to enforce the power limit. For example, some servers include a Baseboard Management Controller (BMC) that a service processor may use to monitor real-time power consumption by a server and throttle the processors as necessary to enforce the power limit. The processors are throttled down to sacrifice performance for the sake of enforcing the power limit. In cases where the power limit was chosen due to a physical power distribution limitation of the associated datacenter, the power capping feature prevents excessive stress on the power distribution pathways. In other cases, the user may choose to limit power for budgetary reasons, in which case power capping helps control the cost of running a datacenter. Power-capping is used to limit power consumption even though the datacenter infrastructure may be able to support additional power demands.

Whether for a single computing device (e.g. a server) or a network of multiple devices (e.g. a rack of networked servers), computing power consumption is generally dynamic, rather than constant. Because power demand varies with time, there will typically be some periods during which power demanded by the datacenter or subsystems thereof exceeds a specified power limit, and other times when power demand is less than the specified power limit. When demand exceeds a threshold, power consumption is limited by power capping. However, when demand is less than the threshold, the datacenter or subsystems thereof may be underutilized. It would therefore be desirable to develop a power management solution that compensates for the periods of underutilization, to maximize server throughput.

SUMMARY OF THE INVENTION

One embodiment provides a method of managing power in a computer system having a plurality of servers. An upper power limit and an average power limit that is less than the upper power limit are selected for each server. The instantaneous power consumption and the average power consumption of each server is determined. The instantaneous power consumption of each server is prevented from exceeding the respective upper power limit. A first subset of the servers is identified for which the average power consumption is less than the average power limit. The instantaneous power consumption of each server in the first subset is allowed to exceed the respective average power limit. A second subset of the servers is identified for which the average power consumption is not less than the average power limit. The instantaneous power consumption of each server in the second subset is prevented from exceeding the respective average power limit.

A second embodiment provides a computer program product including computer useable program code embodied on a computer usable storage medium for managing power in a computer system having a plurality of servers. The computer program product comprises computer usable program code for inputting for each server an upper power limit and an average power limit that is less than the upper power limit, computer usable program code for obtaining the instantaneous power consumption and the average power consumption of each server, computer usable program code for preventing the instantaneous power consumption of the servers from exceeding the respective upper power limits, computer usable program code for identifying a first subset of the servers for which the average power consumption is less than the average power limit and allowing their respective instantaneous power consumptions to exceed the respective average power limits, and computer usable program code for identifying a second subset of the servers for which the average power consumption is not less than the average power limit and preventing the respective instantaneous power consumptions from exceeding their respective average power limits.

A third embodiment provides a power-managed multi-server computer system. A plurality of power-consuming servers are each in communication with a power supply for receiving a variable amount of power. A power meter detects the power consumption of each server and outputs a power consumption signal representative of the detected power consumption. A throttling mechanism is configured for selectively limiting the power consumption of each server to prevent the instantaneous power consumption of each server from exceeding an upper power limit selected for the server. A power management module in communication with the plurality of servers receives the power consumption signal from the power meter of each server, determines the instantaneous power consumption and the average power consumption of each server, and determines a first subset of the servers for which the average power consumption is less than the respective average power limit. The instantaneous power consumption of each server in the first subset is allowed to exceed the respective average power limit, and the instantaneous power consumption of each server not in the first subset is prevented from exceeding the respective average power limit.

Other embodiments, aspects, and advantages of the invention will be apparent from the following description and the appended claims.

DETAILED DESCRIPTION OF PREFERRED EMBODIMENTS

The present invention provides embodiments of a system, method, and computer program product for managing power in an electronic system having a plurality of power-consuming electronic devices. The invention is particularly applicable in the realm of computer systems having a plurality of rack-mounted servers and supporting hardware devices. Such servers may include a precision feedback control system for selectively throttling the servers to control their power consumption. A power-management method according to the invention may be implemented by a method running on the computer system that utilizes this feedback-based control functionality to manage power in the computer system. Thus, the invention will be discussed extensively in the context of managing power to a computer system having a plurality of servers. One skilled in the art having benefit of this disclosure will appreciate that the invention may also be applied to power-consuming electronic devices other than servers, as well as to other electronic systems having multiple power-consuming electronic devices.

According to one embodiment of the invention, two programmable power-consumption thresholds may be input by a system administrator for each device: an upper power limit and an average power limit that is less than the upper power limit. Power to the computer system is managed by preventing the instantaneous power consumption of each device from exceeding its upper power limit, while also preventing the average power consumption of each device from exceeding its average power limit. The time interval over which the average power consumption is computed is user-selectable. For example, an administrator may select a relatively long time interval (e.g. 24-hour) where the average power consumption is being controlled to satisfy a daily power budget, or a relatively short time interval (e.g. less than 1 hour) where the average power limit is selected to control the amount of heat produced by a server. Various power-reduction techniques may be used for enforcing the average power limit and upper power limit, including, for example, selectively throttling the devices, powering off unused circuitry, reducing a processor clock frequency, reducing a processor operating voltage, introducing wait or hold states into processor activity, performing processor clock gating, or migrating workload between devices. During certain specified allowable time periods, devices whose average power consumption is less than the average power limit may be identified, and the instantaneous power limit for those devices may be allowed to temporarily exceed the average power limit, unless and until the average power consumption reaches the average power limit, or until the allowable time period to exceed the average power limit ends. Furthermore, power to the devices whose average power consumption is currently less than the average power limit may be passively or actively increased. Power to the devices may be actively increased, for example, by throttling up the devices to a level that the instantaneous power consumption exceeds the average power limit, with the intention of increasing the average power consumption until it substantially equals the average power limit.

Though the method of this embodiment is generally intended to prevent the average power consumption from exceeding the average power limit, the average power consumption of a device may exceed its average power limit in some instances, including most notably, when the average power limit for the device is reduced. The average power limit for a device may be reduced, for example, during peak hours wherein energy prices are relatively high. In that case, the instantaneous power consumption of these devices may be throttled down, below the average power limit, until the average power consumption once again equilibrates with the reduced average power limit. By selectively increasing the power consumption of devices whose average power consumption is less than the specified average power limit, the throughput of the servers and the computer system generally is maximized, while still conforming to various policy considerations for managing power consumption of the computer system within the specified thresholds.

Figure 1:
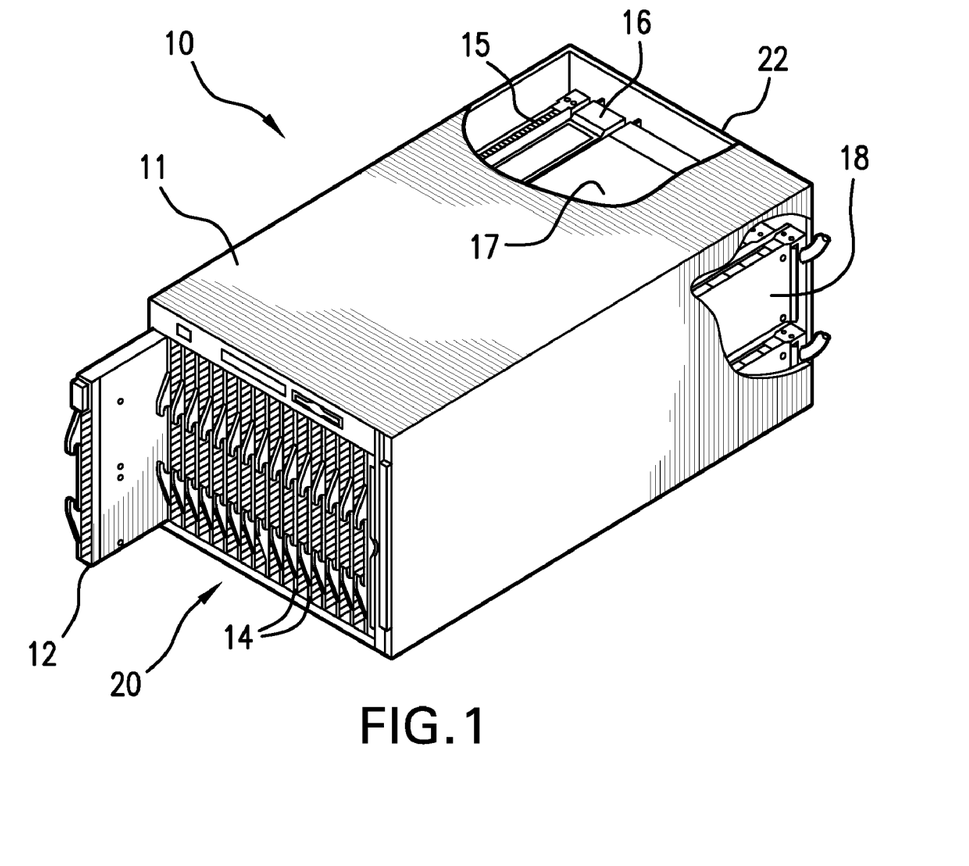
FIG. 1 is a perspective view of an exemplary rack-mountable, multi-server computer system that may be power-managed according to the invention.

FIG. 1 is a perspective view of an exemplary rack-mountable, multi-server computer system 10 that may be power-managed according to the invention. The computer system 10 includes a chassis 11 that houses a plurality of blade servers 12 and other hardware devices. Each blade server 12 may include one or more microprocessors, hard drives, and memory to service one or more common or independent networks. The computer system 10 also includes a variety of shared support modules, including a chassis management module 15, one or more power supply modules 16, one or more blower modules 17, and multiple switch modules 18. The management module 15 manages the chassis, blade servers, and other modules. The power modules 16 provide power to the system. The blower modules 17 generate airflow through the chassis 11 to cool the computer system. The switch modules 18 provide network connectivity between the blade server I/O and the network. An acoustic module (not shown) may be included to reduce noise. The blade servers 12 are installed in the front 20 of the chassis 11 and the support modules 15-18 are installed in the rear 22 of the chassis 11. The blade servers 12 and support modules 15-18 meet at an internal chassis interface known as the midplane, which provides all of the interconnections among the blade servers 12, modules, media tray, and DC power distribution throughout the chassis. Connectors at the midplane couple the blade servers 12 with the support modules 15-18 to reduce wiring requirements and facilitate installation and removal of the blade servers 12.

Figure 2:
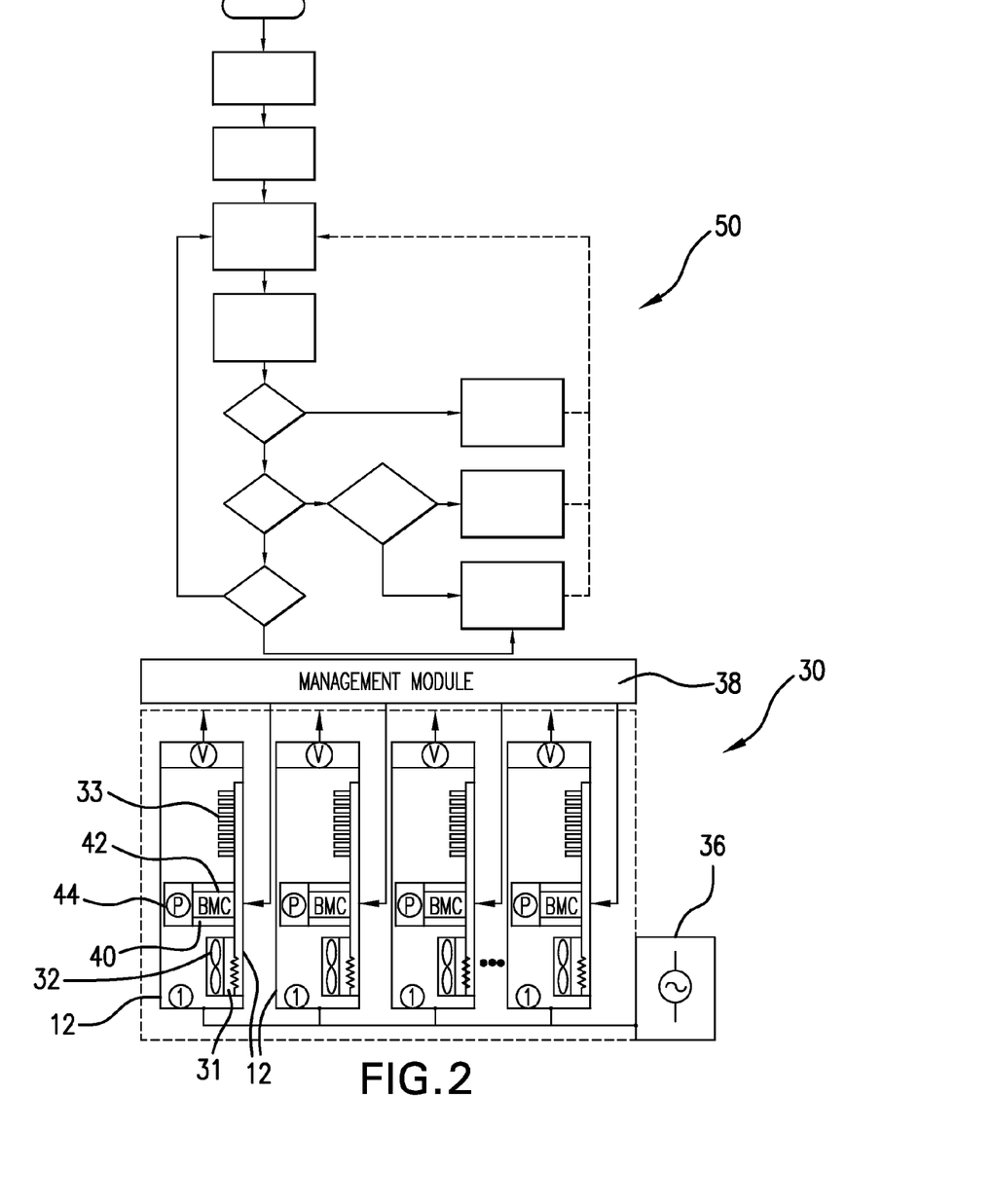
FIG. 2 is a schematic diagram of a power-managed computer system according to one embodiment of the invention, in the context of a multi-server computer system.

FIG. 2 is a schematic diagram of a power-managed computer system 30 according to one embodiment of the invention, in the context of a multi-server computer system. The computer system 30 may schematically represent, for example, the multi-server computer system 10 of FIG. 1 or a subsystem thereof. The computer system 30 includes a number "N" of servers 12. Each server 12 includes one or more processors or CPUs 31 and memory 33 that may be selectively throttled (throttling a server's processors, memory, or other subsystems may be generically described herein as throttling the server). A power supply 36 supplies power to the computer system 30. The power supply 36 is depicted here as a unitary power supply module shared among the servers 12, such as the power module 16 of FIG. 1. Alternatively, the power supply 36 may comprise multiple power modules, such as one on-board power supply module per server 12. A cooling unit 32 is also included for cooling the servers 12. Here, the cooling unit 32 is depicted as including one cooling fan per server 12. Alternatively, the cooling unit 32 may be, for example, a shared blower module such as the blower module 17 of FIG. 1 that generates airflow through a chassis to cool multiple servers 12. A power management module 38 is provided for managing power to the plurality of servers 12 by setting and dynamically adjusting one or more device power limit of each server 12. Each server 12 also includes a local controller 40 that works in tandem with the power management module 38 for controlling and managing power consumption, including enforcing the device power limit dynamically selected for the server 12 by the power management module 38.

Power-management software 50 usable by the power management module 38 and/or the servers 12 provides the logic for implementing a power management method. The software 50 may reside on a computer-readable physical medium. For the purposes of this description, a computer-readable physical medium can be any apparatus that can contain or store, the software for use by or in connection with the power-managed computer. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk - read/write (CD-R/W), and DVD. The medium can be an electronic, magnetic, optical, electromagnetic, infrared, or semiconductor system (or apparatus or device). The physical medium may be read by the computer system 30 into system memory of the management module 38, servers 12, or both, for being accessed and executed by the power management module 38 and servers 12. The processors 31 may be coupled directly or indirectly to memory 33 or other memory elements through a system bus. The memory 33 can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters. A user may enter commands and information into the computer system through input devices, such as a keyboard and a mouse. Other input devices may include a microphone, joystick, game pad, touch pad, satellite dish, scanner, or the like. These and other input devices are often connected to processing unit through a USB (universal serial bus) that is coupled to the system bus, but may be connected by other interfaces, such as a serial port interface, a parallel port, game port, or the like. A graphical user interface (GUI) including a display device may also be connected to a system bus via an interface, such as a video adapter. Thus, a user such as a system.

The local controller 40 in this embodiment includes a baseboard management controller (BMC) 42. The BMC 42 is a specialized microcontroller embedded in the motherboard and is a component in the Intelligent Platform Management Interface (IPMI) architecture. The function of the BMC 42 conventionally includes receiving input from sensors and sending an alert to the administrator if any parameters do not stay within predefined limits. The BMC manages the interface between system management software and platform hardware. Sensors built into the computer system report to the BMC on parameters such as power, temperature, cooling fan speeds, and operating system (OS) status. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again. The embedded sensors include a power sensor 44 that senses power consumption by the server 12 and outputs a signal representative thereof. The power management module 38 communicates with the power meters 44 and processes the power consumption signals to control power to the servers in a manner prescribed by the inventive methods detailed below.

In one exemplary architecture, physical interfaces to the BMC may include a System Management Bus (SMB), a serial-communication interface such as an RS-485 serial console, address and data lines and an Intelligent Platform Management Bus (IPMB), that enables the BMC to accept IPMI request messages from other management controllers in the system. The BMC may communicate with a BMC management utility (BMU) on a remote client using IPMI protocols. The BMU is usually a command line interface (CLI) application. Connection to the BMC over LAN may or may not use encryption depending on the security concerns of the user. In addition to conventional functionality of the BMC 42, the BMC 42 is configured to enforce dynamic device power limits on the respective server 12 according to an embodiment of a power management method. Although a particular architecture is described here by way of example, the invention contemplates that this BMC architecture is subject to change over time, and that the invention may be adapted to work with such revised architectures. The invention further contemplates alternative embodiments of a power-managed computer system that may implement a power management method without the use of a BMC.

The power management module 38 may select and dynamically, independently adjust the device power limit on each server 12, to be enforced by the local controller 40 of each server 12. The value of the device power limit for each server 12 may vary anywhere within the range of the server's performance specification, but does not necessarily vary to the full extent of that range. For example, the design specification for a particular server may vary between a minimum power of 5 W and a maximum power of 100 W, and the power management module 38 may vary the device power limit of that server anywhere within that range.

A variety of techniques may be used by the local controller 40 to enforce the device power limits on the servers 12. Such techniques may include selectively "throttling" the processor 31 or memory 33, placing subsystems into power-saving modes of operation, migrating workload between the devices, or powering off unused circuitry. Examples of throttling techniques include reducing clock frequency or operating voltage of the processors 34, introducing wait or hold states into the activity of the processors 31, performing processor clock gating, and reducing processor supply voltages. Although there may be some correlation between processor load and power consumption in a server, processor load is not always a reliable indicator of power consumption because of the behaviors of the underlying microarchitectures, transistor variability on a per-chip basis, and many other complex factors that affect power consumption. Therefore, the local controller 40 typically includes a precision measurement and feedback control system that may be implemented, for example, using a BMC. The local controllers 40, by virtue of the BMC 42 and power meter 44, are capable of adjusting power on a millisecond time scale, as a hard, real-time proportional control system. This functionality may be used by the software 50 to implement power management according to the invention.

Figure 3:
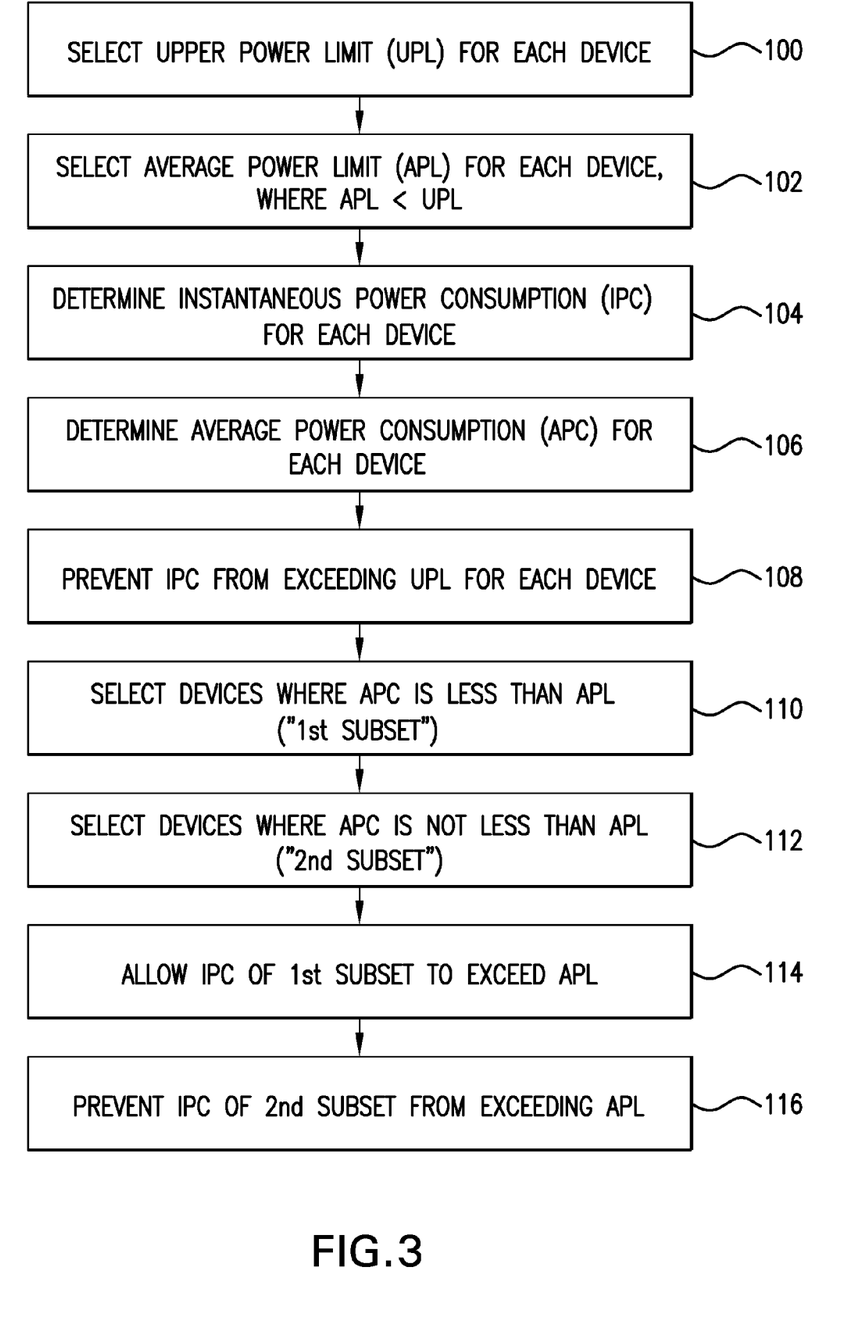
FIG. 3 is a flowchart generally outlining a method of managing power in a computer system according to one embodiment of the invention.

FIG. 3 is a flowchart generally outlining a method of managing power in a computer system according to one embodiment of the invention. The method covers managing power to a computer system having a plurality of power-consuming devices that are capable of determining and reporting their power consumption over time. For example, the devices may be the servers 12 of FIG. 2, having the power meters 44 and related hardware for monitoring and controlling power. However, the method may also be used to managing power to computer system devices other than servers. The power consumption of the devices may be reported individually, such as the individual power consumption of each server, or in terms of subsets of devices, such as the group power consumption of selected groups of servers.

Various power limits may be selected for each device. The method includes selecting for each device at least an upper power limit ("UPL") in step 100 and an average power limit ("APL") in step 102. Additional power limits other than the average power limit and upper power limit may also be specified and imposed under certain conditions. The instantaneous power consumption ("IPC") of each device is obtained in step 104, and the average power consumption (APC) is determined in step 106. The upper power limit is a limit on the instantaneous power consumption of the server. While a device may be physically capable of exceeding the upper power limit, the device is typically power managed according to any of the techniques disclosed herein (throttling, workload migration, etc.), so that the instantaneous power consumption preferably does not exceed the upper power limit for any appreciable length of time. Step 108 is directed to controlling power to the devices so the instantaneous power consumption does not exceed the upper power limit. The average power limit is a limit on the time-averaged power consumption of a device, and is less than the upper power limit. For example, power may be controlled so that the instantaneous power consumption of a device does not exceed an upper power limit of 100 W and so that the average power consumption of the device does not exceed an average power limit of 70 W. While the instantaneous power consumption should not exceed the upper power limit and the average power consumption should not exceed the average power limit, a power management method contemplates passively allowing the instantaneous power consumption to exceed the average power limit or actively causing the instantaneous power consumption to exceed the average power limit in instances where the average power consumption is currently less than the average power limit.

Factors for selecting the upper power limit of each device (step 100) may include, for example, physical power distribution limitations, safety considerations (e.g. the prevention of blown circuits or excessive temperatures), or cost considerations. In cases where power demanded by a device would otherwise cause the instantaneous power consumption to exceed the upper power limit, a throttling mechanism or other power limiting mechanism may be used in step 108 to limit power consumption of the device so as to prevent the instantaneous power consumption from exceeding the upper power limit. The device may be throttled using a feedback-based power management system. Due to certain limitations of computing equipment, such power adjustments used to enforce the upper power limit may lag behind the detection of any increased power by the feedback-based power management system, so that the upper power limit might be exceeded for a brief moment until the throttling or other power-reducing technique takes effect on the device. Such momentary power excesses are not considered to violate step 108, as the consequence of such surges would generally be benign and the predominant effect is still to prevent the instantaneous power consumption from exceeding the upper power limit for any appreciable length of time. The upper power limit and average power limit may also be periodically adjusted during each iteration of steps 100 and 102, such as to account for time-variable energy costs. For example, the average power limit may be selectively reduced during time periods of increased energy prices and increased during time periods of decreased energy prices.

In step 110, a first subset of the devices is identified for which the average power consumption of each device is less than its average power limit. In step 112, a second subset of devices is identified for which the average power consumption of each device is not less than the average power limit. Generally, each device is going to fit into either the first subset or the second subset at any given moment, so the second subset may be readily determined as those devices which do not belong to the first subset. Because the devices of the first subset are each operating below their average power limits, the instantaneous power consumption for these devices is allowed to exceed their average power limit in step 114. Step 114 may be performed passively, such as by simply allowing the instantaneous power consumption for the first subset of devices to exceed the average power limit if the power demand happens to exceed the average power limit. Alternatively, the first subset of devices may be actively throttled up, so their instantaneous power consumption exceeds their average power limit. Though these servers may be throttled above their respective average power limit values, care should still be taken not to exceed the instantaneous power consumption, in accordance with step 108. By contrast, the second subset of devices are already operating at or above their average power limits, and the instantaneous power consumption for the second subset of devices is prevented from exceeding their respective average power limit according to step 116. The second subset of devices may be throttled down, for example, such that the instantaneous power consumption of each device does not exceed its respective average power limit.

Figure 4:
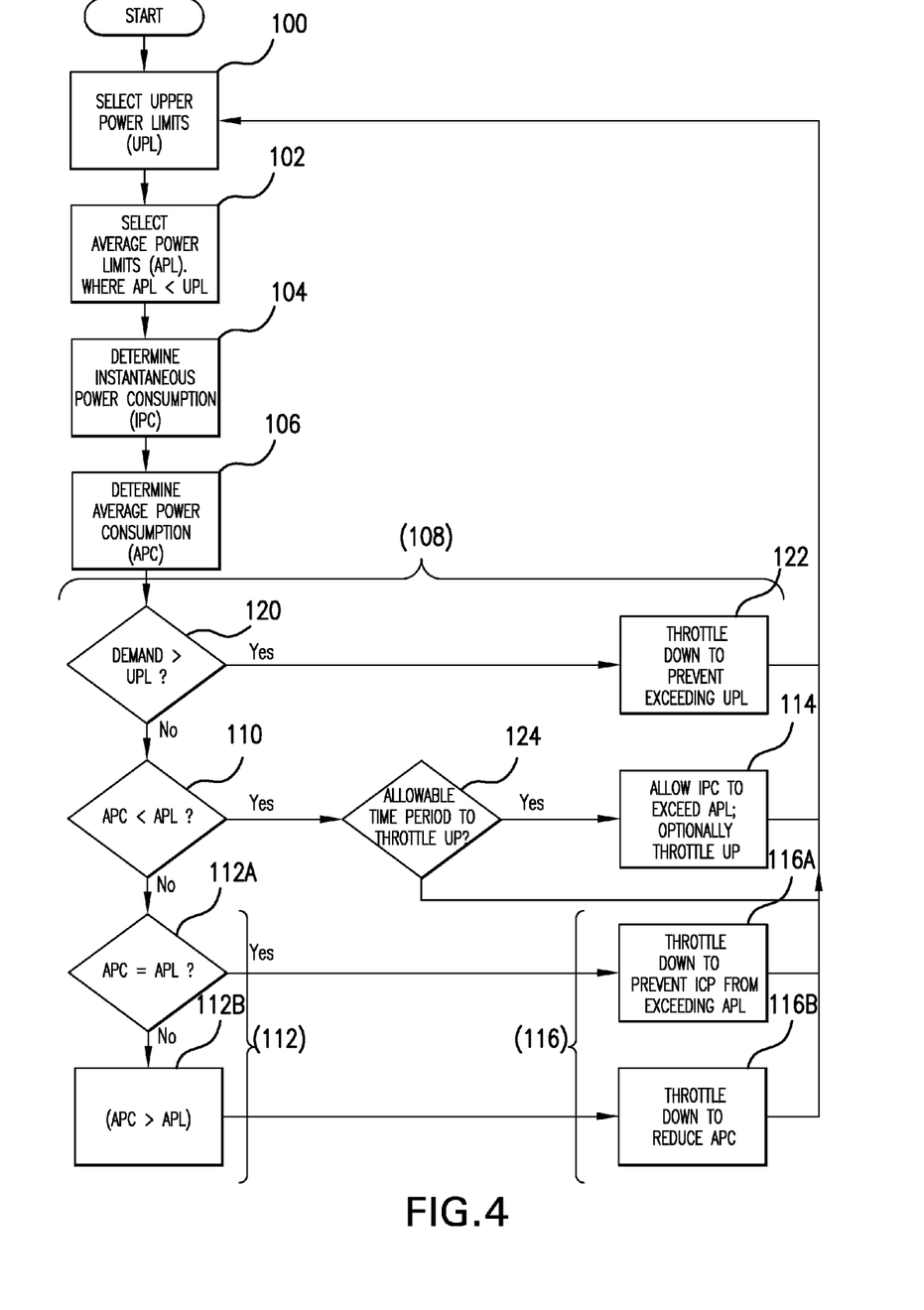
FIG. 4 is a flowchart outlining one example of a method for power-managing a computer system whose plurality of devices includes servers.

The method of FIG. 3 may be embodied in the form of a method for power-managing a computer system whose plurality of devices includes servers. FIG. 4 is a flowchart outlining a more detailed example of such a method. The method may be implemented on a computer system as software 50 of the computer system 30 of FIG. 2, for managing power to the plurality of servers 12. The flowchart of FIG. 4 includes steps similar to those of FIG. 3, as applied specifically to power-managing a plurality of servers. These similar steps are accorded like reference numerals. Other steps of FIG. 4 are akin to sub-steps of certain steps in FIG. 3, and are accorded different reference numerals.

Referring now to FIG. 4, the upper power limit is selected for each device in step 100 and an average power limit is selected for each device in step 102. The upper power limit and average power limit may be user-selectable parameters chosen and input to the power-managed computer system by a system administrator. The instantaneous power consumption and average power consumption are determined in steps 104 and 106, respectively. For example, a power meter may output real-time power signals indicative of the instantaneous power consumption to a power management module. The power module may convert the real-time power signal to instantaneous power-consumption values. Further, the power module may sample the real-time power signal over time to compute the average power consumption values. The power management module may then use this dynamic instantaneous power consumption and average power consumption data as feedback used to manage power and enforce the upper power limit and average power limit for each server, as follows.

Steps 120 and 122 are directed to preventing the instantaneous power consumption from exceeding the upper power limit for each device, in accordance with method step 108 of FIG. 3. Conditional step 120 queries whether for a particular server the power demanded by the server would exceed the upper power limit. If the power demand at a particular moment exceeds the upper power limit, then the servers are throttled down in step 122 to ensure that the instantaneous power consumption does not exceed the upper power limit.

Conditional step 110 is used to identify the servers for which the average power consumption is less than the average power limit. This "first subset" of servers may be throttled up if it is an allowable time period for doing so, as determined in conditional step 124. The allowable time period for throttling up is another parameter that may be input by an administrator. The allowable time periods may reflect certain policy considerations for operating the data center. For example, the price of power typically varies over time, and the administrator may specify certain off-peak time periods for allowing the servers to be throttled up. During an allowable time period, the instantaneous power consumption of each of the first subset of servers will be allowed to exceed their average power limit according to step 114, but without exceeding the upper power limit according to step 122. These servers may be passively allowed to exceed their average power limit, or they may be actively throttled up to deliberately cause them to exceed their average power limit.

Step 112, as introduced in FIG. 3, is directed to selecting the "second subset" of devices whose average power consumption is "not less than" the average power limit. The method of FIG. 4 gives separate treatment to those servers for which the average power consumption is substantially equal to the average power limit and the servers for which the average power consumption exceeds the average power limit. According to conditional step 112A, if the average power consumption is substantially equal to the average power limit, then the server is throttled down in step 116A so that the instantaneous power consumption does not exceed the average power limit. By preventing the instantaneous power consumption from exceeding the average power limit, the average power consumption is prevented from increasing above the average power limit, to maintain the average power consumption at or below the average power limit.

The method is structured as a loop, so the conditional steps 110 and 112 are repeated to ensure that the average power limit generally does not exceed the average power consumption. However, under certain conditions, the average power consumption may still exceed the average power limit. This can occur if, for example, the average power limit is suddenly reduced in a subsequent iteration of step 102. The average power limit may be reduced, for example, to account for the time-varying cost of energy. Thus, if the average power consumption of a server exceeds the average power limit in conditional step 112B, then the server is throttled down in step 116B enough to reduce the value of the average power consumption over time, until the average power consumption no longer exceeds the average power limit. The further the instantaneous power consumption is reduced, the sooner the average power consumption value will be reduced to at or below the average power limit. However, the condition specified in step 112B is not necessarily an emergency or fault condition, and it may be acceptable for the average power consumption to be reduced slowly until it is once again in equilibrium with the average power limit. A situation where this may be true is where the average power limit is specified for a certain interval, such as one day. For example, the administrator may specify an average power limit for each device that is intended to be satisfied in 24 hour cycles. Thus, if several hours remain in a 24-hour cycle, the instantaneous power consumption for a device whose average power consumption temporarily exceeds the average power limit in step 112B may be reduced to a level calculated to achieve the specified average power limit before the expiration of the 24-hour period. Thus, while the method generally strives to maintain a server at or near its average power consumption without exceeding the average power limit, the method can compensate for a reduction in the average power limit in step 102 that results in the average power consumption temporarily exceeding the reduced average power limit.

Various methodologies are available to an administrator for selecting and enforcing the average power limits. One aspect of selecting and enforcing average power limits is the timeframe over which the average power consumption is computed. It is possible to calculate an average power consumption based only on very recent history or otherwise based on prolonged history. For example, if the average power limit is selected to operate a system within budgetary parameters, e.g. to operate each device within a daily power budget, the average power consumption may be calculated based on an extended, 24-hour timeframe. In another example, the average power limit may be selected to control heat production. For instance, the heat produced by a server may be primarily dependent upon its average power consumption, rather than on fluctuations in its instantaneous power consumption. In that case, the average power consumption may be computed over a relatively short time interval, such as less than an hour, and the performance of the device in the previous interval (e.g. the previous hour) may have a negligible influence on how the device is operated in the current interval to control the production of heat. Furthermore, the administrator has the discretion to base the average power consumption on very few or very many data points. The number or frequency of taking data points may also vary depending on whether a particular device is currently operating above or below the average power limit. For example, power consumption data points may be taken with greater frequency for a device operating above the average power limit, as the system compensates by reducing the instantaneous power consumption of that device and attempts to equilibrate the average power consumption with the current average power limit.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of managing power in a computer system having a plurality of servers, comprising:
selecting for each server an upper power limit and an average power limit that is less than the upper power limit;
determining the instantaneous power consumption and the average power consumption of each server;
preventing the instantaneous power consumption of each server from exceeding the respective upper power limit;
identifying a first subset of the servers for which the average power consumption is less than the average power limit and allowing the instantaneous power consumption of each server in the first subset to exceed the respective average power limit; and
identifying a second subset of the servers for which the average power consumption is not less than the average power limit and preventing the instantaneous power consumption of each server in the second subset from exceeding the respective average power limit.

2. The method of claim 1, further comprising identifying the servers for which the average power consumption is substantially equal to the average power limit, and reducing the instantaneous power consumption of the identified servers to maintain the average power consumption substantially equal to the average power limit.

3. The method of claim 1, further comprising identifying the servers for which the average power consumption is greater than the average power limit, and reducing the instantaneous power consumption of the identified servers below the average power limit.

4. The method of claim 1, further comprising:
allowing the instantaneous power consumption of each server in the first subset of servers to temporarily exceed the respective average power limit until the respective average power consumption is substantially equal to the respective average power limit.

5. The method of claim 1, further comprising:
selecting a time period during which the instantaneous power consumption of the first subset of servers are allowed to exceed the average power limits; and
allowing the instantaneous power consumption of each server in the first subset of servers to exceed the respective average power limit only during the scheduled time period.

6. The method of claim 1, wherein the step of preventing the instantaneous power consumption of the servers from exceeding the respective upper power limits and the step of preventing the instantaneous power consumption of the second subset of servers from exceeding their respective average power limits comprise throttling processors or memory on the servers, powering off unused circuitry, reducing a processor clock frequency, reducing a processor operating voltage, introducing wait or hold states into processor activity, performing processor clock gating, or migrating workload between servers.

7. A computer program product including computer usable program code embodied on a computer usable storage medium for managing power in a computer system having a plurality of servers, the computer program product comprising:
computer usable program code for inputting for each server an upper power limit and an average power limit that is less than the upper power limit;
computer usable program code for obtaining the instantaneous power consumption and the average power consumption of each server;
computer usable program code for preventing the instantaneous power consumption of the servers from exceeding the respective upper power limits;
computer usable program code for identifying a first subset of the servers for which the average power consumption is less than the average power limit and allowing their respective instantaneous power consumptions to exceed the respective average power limits; and
computer usable program code for identifying a second subset of the servers for which the average power consumption is not less than the average power limit and preventing the respective instantaneous power consumptions from exceeding their respective average power limits.

8. The computer program product of claim 7, further comprising computer usable program code for identifying the servers for which the average power consumption is substantially equal to the average power limit, and reducing the instantaneous power consumption of the identified servers to maintain the average power consumption substantially equal to the average power limit.

9. The computer program product of claim 7, further comprising computer usable program code for identifying the servers for which the average power consumption is greater than the average power limit, and reducing the instantaneous power consumption of the identified servers below the average power limit.

10. The computer program product of claim 7, further comprising computer usable program code for allowing the instantaneous power consumption of the first subset of servers to temporarily exceed the respective average power limits until the average power consumption is substantially equal to the average power limit.

11. The computer program product of claim 7, further comprising:
computer usable program code for inputting a time period during which the instantaneous power consumption of the first subset of servers are allowed to exceed the average power limits; and
computer usable program code for allowing the instantaneous power consumption of the first subset of servers to exceed the respective average power limits only during the scheduled time period.

12. The computer program product of claim 7, wherein the computer usable program code for preventing the instantaneous power consumption of the servers from exceeding the respective upper power limits and the computer usable program code for preventing the instantaneous power consumption of the second subset of servers from exceeding the respective average power limits comprise computer usable program code for throttling processors or memory on the servers, powering off unused circuitry, reducing a processor clock frequency, reducing a processor operating voltage, introducing wait or hold states into processor activity, performing processor clock gating, or migrating workload between servers.

13. A power-managed multi-server computer system, comprising:
- a plurality of power-consuming servers each in communication with a power supply for receiving a variable amount of power, a power meter for detecting the power consumption of each server and outputting a power consumption signal representative of the detected power consumption, and a throttling mechanism configured for selectively limiting the power consumption of each server to prevent the instantaneous power consumption of each server from exceeding an upper power limit selected for the server;
- a power management module in communication with the plurality of servers for receiving the power consumption signal from the power meter of each server, determining the instantaneous power consumption and the average power consumption of each server, and determining a first subset of the servers for which the average power consumption is less than the respective average power limit; and
- wherein the instantaneous power consumption of each server in the first subset is allowed to exceed the respective average power limit, and wherein the instantaneous power consumption of each server not in the first subset is prevented from exceeding the respective average power limit.

14. The power-managed multi-server computer system of claim 13, wherein the management module is configured for identifying each server for which the average power consumption is substantially equal to the average power limit, and instructing each identified server to reduce the respective instantaneous power consumption to maintain the average power consumption substantially equal to the average power limit.

15. The power-managed multi- server computer system of claim 13, wherein the management module is configured for identifying each server for which the average power consumption is greater than the average power limit, and instructing each identified server to reduce the respective instantaneous power consumption to below the average power limit.

16. The power-managed multi-server computer system of claim 13, wherein the power management module is configured for instructing the servers to throttle processors or memory on the servers, power off unused circuitry, reduce processor clock frequency, reduce processor operating voltage, introduce wait or hold states into processor activity, perform processor clock gating, migrate workload between servers, or combinations thereof, to prevent the instantaneous power consumption of each server from exceeding the respective upper power limit and to prevent the instantaneous power consumption of each server not in the first subset of servers from exceeding the respective average power limit.

* * * * *